Figure 1:
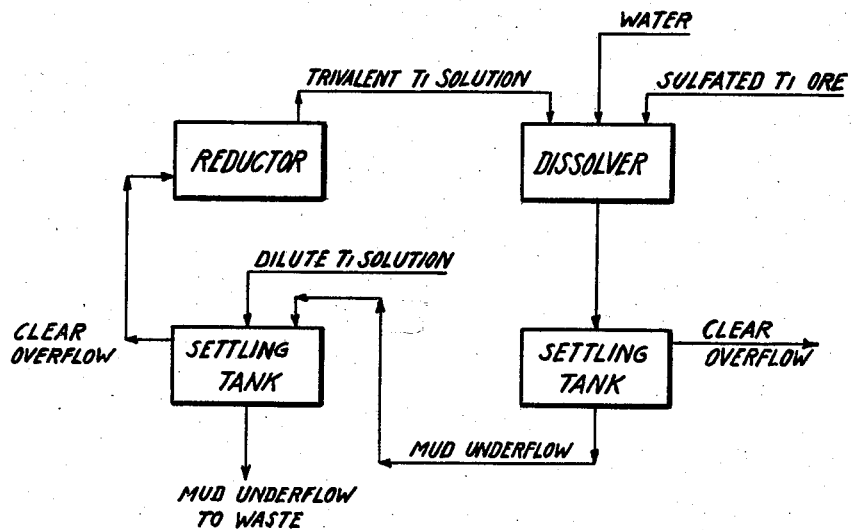

Patented Aug. 4, 1936

2,049,504

UNITED STATES PATENT OFFICE 2,049,504

CYCLIC PROCESS FOR REDUCING TITANIUM SULPHATE LIQUORS

Ignace J. Krchma, Brooklyn, Md., assignor, by mesne assignments, to E. I. du Pont de Nemours and Company, a corporation of Delaware Application September 21, 1934, Serial No. 744,903

6 Claims. (Cl. 23—202)

This invention relates to the reduction of titanium sulphate-iron sulphate solutions, and is particularly directed to cyclic processes wherein a portion of the solution is reduced to a point where the titanium is in the trivalent state and this portion is returned to reduce the ferric iron content of a titanium sulphate-iron sulphate solution.

In the manufacture of titanium oxide from titaniferous ores, such as ilmenite, the ores are treated with sulphuric acid to open them and yield soluble iron sulphates and titanium sulphate. The attack mass is then dissolved in water, preliminary to further treatment. As the ore contains iron in both the ferrous and ferric states, the solution obtained contains both ferrous and ferric sulphates. The solution also contains, of course, sulphuric acid, titanium sulphate, and minor amounts of the sulphates of other metals. If this solution is heated to produce titanium oxide by hydrolysis of the titanium sulphate, some of the iron will precipitate and contaminate the product. It has been found that if the ferric iron is reduced to the ferrous state prior to hydrolysis little difficulty is experienced in obtaining a product relatively free from iron.

The dissolving operation is normally carried out in an agitated tank to which is added titanium iron sulphate mass, water or dilute titanium liquors, and a reducing agent such as iron turnings. The dissolving is much accelerated by maintaining a low concentration of trivalent titanium during the operation and is therefore desirable. Agitation of the solution is necessary since it contains suspended particles of mass as well as residual ilmenite which would tend to settle out in the tank. The iron must also be kept in suspension to prevent the settling out of solids around the iron, which would decrease the efficiency of the operation.

I have found that the reduction of a titanium sulphate-iron sulphate solution may be effected with suitable reducing agents which are not in finely divided form. I may use the agent in the form of bales, heavy turnings, etc., and as the reducing agents are more easily obtained and are less expensive in such undisintegrated form, I effect a considerable economy in the reduction of titanium sulphate-iron sulphate solutions.

According to the process of my invention a titanium sulphate-iron sulphate solution, in which the iron sulphate has been reduced to the ferrous state, is passed through a receptacle which contains the reducing agent. The titanium is reduced to the trivalent state by the reducing agent and is then added to the attack mass which is being dissolved. The trivalent titanium quantitatively reduces the ferric iron to the ferrous state and, of course, is itself oxidized to tetravalent titanium sulphate. Enough of the trivalent titanium is added to the attack mass to leave a slight excess of trivalent titanium in the solution after all of the iron is reduced. This is done, as in U. S. 1,333,849, to Olson, to compensate for air oxidation of the solution during subsequent treatment.

In carrying out the above procedure the following reaction takes place in the passage of the titanium solution over the reducing agent:

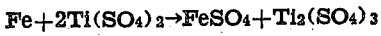

Upon adding this trivalent titanium solution to the dissolving mixture the reaction is shown by the equation

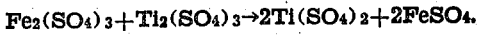

The combination of these two equations which represents the total reaction is shown by the reaction

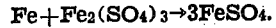

The final chemical effect is the same as if the dissolving were carried out by conditions well known in the art. The improvement lies in the fact that cheaper reducing agents are made available along with the fact that the resulting solutions can be freed of suspended mud particles with greater ease.

By the use of my process there is obtained an improved efficiency of the reducing agent. This is due to the elimination of the violent agitation which is necessary to keep the reducing agent in suspension. In my process the equipment and rates of flow of the solution through the reducing agent can be so chosen that reoxidation of the solution by air and generation of hydrogen, both of which decreases the efficiency of the operation, can be almost eliminated. The resulting solution is also freer of suspended particles because of the higher purity of the reducing agents which my process can consume. The reducing agent most readily obtainable for use in prior processes consists largely of cast iron turnings. These contain appreciable amounts of silica and carbon, which make the purification of the resulting solution very difficult. I am able to use iron scrap such as used tin scrap, galvanized iron clippings, and other waste iron products. These contain less insoluble impurities and give excellent results, both as to efficiency and to quality of the reduced titanium liquor.

While I may use any of the reducing agents heretofore known to the art such as iron, zinc, etc., I prefer to use metal couples such as are described and claimed in my co-pending application Serial No. 744,902, filed September 21st, 1934.

The metal couples which I prefer to employ are composed of at least two metals between calcium and hydrogen in the electromotive series. For example, I use such couples as magnesium-iron, cadmium-tin, zinc-iron-tin, zinc-iron, etc. I usually prefer to use a major amount of the metals higher in the electromotive series. Because of certain disadvantages attendant upon the use of certain of the metals I prefer to use at least two metals selected from the group comprising magnesium, aluminum, zinc, iron, and tin. The metals are used in discrete but closely associated form.

As the receptacle containing the reducing agent would quickly choke up if the titanium sulphate solution contained insoluble matter, a solution is used in which the ferric iron may or may not have been reduced and from which slime has been removed. As will appear hereinafter, I preferably use the weak wash liquors ordinarily obtained when the solution is clarified, but I may use some of the concentrated solution obtained by the clarification treatment.

In the appended drawing there is seen:

Figure 1, a flow sheet of my preferred process, and

Figure 2:
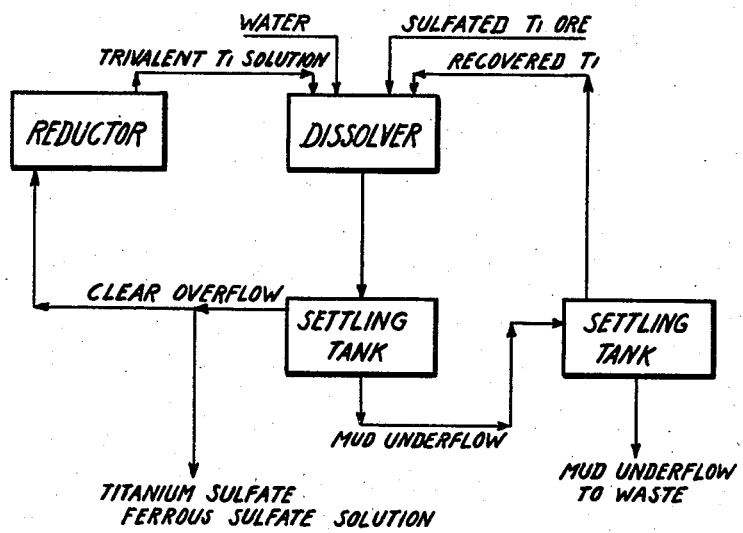

Figure 2, a flow sheet of a slightly modified process.

The following example will more fully explain my preferred process:

*Example 1.*—The process of this example is illustrated by the flow sheet of Figure 1, of the drawing. Ilmenite was digested with sulphuric acid and the attack mass charged into a dissolver, together with water and the required amount of trivalent titanium solution. The mass was dissolved and the ferric iron reduced to the ferrous state. The reduced solution was then run into a settling tank wherein the solution was separated from insoluble matter by decantation. The clear overflow, which contained titanium sulphate and ferrous sulphate, was withdrawn and subjected to further treatments which constitute no essential part of this invention. The insoluble material settled to the bottom of the tank and was withdrawn and charged into a second settling tank. These muds were suspended in a dilute titanium solution which was charged into the settling tank. The muds which settled in this tank contained, of course, much less titanium than the muds from the first settling tank. These muds were then withdrawn and discharged to waste. These muds can, of course, be charged into a third settling tank and further titanium recovered. The resulting titanium solution can be used as a suspending medium in the second settling tank, though I can use dilute titanium sulphate solutions and/or dilute sulphuric acid solutions from any source as suspending media.

The weak wash liquors obtained as a clear overflow from the second settling tank had the following composition:

| | Grams per liter |
|---|---|
| Titanium (as $TiO_2$) | 70 |
| Iron (all ferrous) | 50 |
| Sulphuric acid (total) | 250 |

As seen in Figure 1, this weak wash liquor was passed through a reductor containing tin scrap and the titanium reduced to the trivalent state. The operating temperature was about 30° to 50° C. and the efficiency of the reduction about 90% to 95%. About 0.38 pounds of tin scrap were used for each 1 pound equivalent of $TiO_2$ reduced. This efficiency is not lowered even if the temperature is raised to 60° C. After reduction the trivalent titanium solution was added to the dissolver where it reduced the ferric iron. As above noted, a slight excess of trivalent titanium is preferably added so as to compensate for air oxidation in subsequent operations. The amount of trivalent titanium added is easily controlled. One may, for example, use the amount required of the reduced wash liquors. As it is desirable to return all of the wash liquors and so conserve the titanium therein, I may by-pass any excess around the reductor. A control may also be exercised by controlling the rate of flow through the reductor, running the wash liquor rapidly through the reductor so as to decrease the extent of the reduction of titanium to the trivalent form. If more trivalent titanium is required than is obtainable by complete reduction of the weak wash liquors, I may follow the procedure of Figure 2, in part, and pass some of the more concentrated, clarified titanium sulphate-ferrous sulphate solution through the reductor.

The presence of ferric iron is readily detected by the addition of KCNS which gives a red coloration. The amount of ferric iron is readily determined by titration with a standard solution of trivalent titanium. Likewise the amount of trivalent titanium which a solution contains can be determined by titration with standard ferric solution. Potassium thiocyanate is suitable for the indicator in either titration. Using these methods of determination I may use the above mentioned expedients to adjust the amount of trivalent titanium to the requirements of the solution being reduced. In practice, I prefer to run quite an excess of titanium solution through the reductor, regulating either the amount of iron in the reductor or the period of retention of the solution in the reductor so as to get the required amount of reduced titanium for the dissolving operation. If the weak wash liquors are not sufficient in volume to dissolve all of the attack mass, water may be added to the dissolver.

Instead of tin scrap I may, of course, use other reducing agents. The following example shows the use of iron in the process of Figure 1.

*Example 2.*—The process of Example 1 was followed except that iron was used in the reductor instead of tin scrap. Operating at 30° to 50° C. approximately 0.7 pound of iron was required to reduce 1 pound equivalent of $TiO_2$ to the trivalent state. The efficiency at 30° to 50° C. was only 40 to 60%. There was a very considerable evolution of hydrogen.

As seen in this example, the use of low concentration wash liquors is not entirely satisfactory when iron is used in the reductor. Accordingly, I prefer to use more concentrated solutions in the reductor when iron alone is used as a reducing agent. The following example illustrates such a process:

Example 3.—As seen in Figure 2, attack mass, water, recovered titanium, and a trivalent titanium solution were charged into a dissolver. The resulting reduced solution was run into a settling tank, as in Examples 1 and 2, and the solution freed from slimes. The muds, as in Examples 1 and 2, were washed in a second settling tank and the clear wash liquors returned to the dissolver. The clear solution from the first settling tank had about the following composition:

|  | Grams per liter |
|---|---|
| Total Ti (as $TiO_2$) | 150 |
| Trivalent Ti (as $TiO_2$) | 2 |
| Iron | 110 |
| Total $H_2SO_4$ (combined and free) | 500 |

The major portion of this concentrated titanium sulphate solution was discharged for further treatment. A portion of the solution was withdrawn in the amount required to effect a complete reduction of the ferric iron in the dissolver plus the amount required to compensate for air oxidation in subsequent operations, and run into a reductor. The reaction of the concentrated solution with iron was operated at 60° to 80° C. The efficiency varied from about 75 to 80%, using about 2.7 pounds of iron for each one hundred pounds of attack mass. An efficiency of about 90% was obtained at about 50° C., but the slimes turned colloidal and were difficult to remove.

The trivalent titanium solution was used in the dissolver to reduce a titanium sulphate-ferric sulphate mass.

While I have disclosed only decantation as a method for separating insoluble material from the titanium solutions, obviously I may use any process which will effect a suitable separation. I may, for instance, filter the solutions.

The processes above described may readily be operated in either a continuous or a discontinuous manner and, while I prefer to employ a continuous process, I do not intend to be limited thereto.

The degree to which the titanium in the solution passing thru the reductor is reduced may be adjusted at will. I prefer to operate the process in such a way that about half of the tetravalent titanium is reduced to trivalent form, because if the reduction is carried much further it becomes less efficient and hydrogen is generated with a consequent waste of reducing agent. But I may operate the process with any desired extent of reduction.

While I have shown a number of specific conditions and specific modes of operation, it will be readily apparent that numerous modifications and variations will readily occur to those skilled in the art. I, accordingly, do not intend to be limited to the examples above given, the scope of my invention being apparent from the following claims.

I claim:

1. In a cyclic process of reducing a solution which contains tetravalent titanium and ferric iron, the steps comprising, reducing the ferric iron content of the solution with trivalent titanium, separately treating a portion of the tetravalent titanium of the solution to reduce it to the trivalent state and employing the trivalent titanium, as above, to reduce the ferric iron content of a solution, the tetravalent titanium being reduced by the action of at least two metals between calcium and hydrogen in discrete form.

2. In a cyclic process of reducing a solution which contains tetravalent titanium and ferric iron, the steps comprising, reducing the ferric iron content of the solution with trivalent titanium, separately treating a portion of the tetravalent titanium of the solution to reduce it to the trivalent state, and employing the trivalent titanium, as above, to reduce the ferric iron content of a solution, the tetravalent titanium being reduced by the action of at least two metals in discrete form selected from the group consisting of magnesium, aluminum, zinc, iron, and tin.

3. In a cyclic process of reducing a solution which contains tetravalent titanium and ferric iron, the steps comprising, reducing the ferric iron content of the solution with trivalent titanium, separately treating a portion of the tetravalent titanium of the solution to reduce it to the trivalent state, and employing the trivalent titanium, as above, to reduce the ferric iron content of a solution, the tetravalent titanium being reduced by the action of at least two metals in discrete form selected from the group consisting of magnesium, aluminum, zinc, iron, and tin, the metal higher in the electromotive series being used in major amount.

4. In a cyclic process of reducing a solution which contains tetravalent titanium and ferric iron, the steps comprising, reducing the ferric iron content of the solution with a solution containing trivalent titanium and ferrous iron, removing insoluble material from the reduced solution, treating wash liquors obtained by washing the insoluble material to reduce at least a part of their tetravalent titanium content, and employing the resulting trivalent titanium-ferrous iron solution, as above, to reduce ferric iron, the tetravalent titanium being reduced by the action of at least two metals in discrete form selected from the group consisting of magnesium, aluminum, zinc, iron, and tin, the metal higher in the electromotive series being used in major amount.

5. In a cyclic process of reducing a solution which contains tetravalent titanium and ferric iron, the steps comprising, reducing the ferric iron content of the solution with trivalent titanium, separately treating a portion of the tetravalent titanium of the solution to reduce it to the trivalent state, and employing the trivalent titanium, as above, to reduce the ferric iron content of a solution, the tetravalent titanium being reduced by the action of an iron-tin couple.

6. In a cyclic process of reducing a solution which contains tetravalent titanium and ferric iron, the steps comprising, reducing the ferric iron content of the solution with a solution containing trivalent titanium and ferrous iron, removing insoluble material from the reduced solution, treating wash liquors obtained by washing the insoluble material to reduce at least a part of their tetravalent titanium content, and employing the resulting trivalent titanium-ferrous iron solution, as above, to reduce ferric iron, the tetravalent titanium being reduced by the action of tin scrap.

IGNACE J. KRCHMA.